United States Patent Office 3,031,268
Patented Apr. 24, 1962

3,031,268
PROCESS OF PURIFYING SILANE
Carlyle E. Shoemaker, Easton, Pa., assignor to
J. T. Baker Chemical Company
No Drawing. Filed Sept. 6, 1955, Ser. No. 532,747
3 Claims. (Cl. 23—204)

My invention relates to the purification of silane. In particular, my invention relates to the removal from silane of hydrides of elements of group V of the periodic table, i.e. hydrides of nitrogen, phosphorus, arsenic, antimony and bismuth.

The preparation of pure silicon is difficult. Pure silicon is required for use, for example, in making improved transistors and other semi-conductor devices. Silicon is particularly advantageous for this use because it can be used at much higher temperatures than other materials such as germanium. It is difficult, however, to prepare silicon in a state pure enough for use. In particular, hydrides of group V elements are commonly associated with all forms of silicon and they can only be removed with great difficulty. For certain uses the concentration of group V elements in silicon should be in the order of less than a few parts per billion for best results.

Silane, i.e. silicon tetrahydride, is used as a source of silicon by thermally decomposing the silane. It is imperative to remove all traces of group V elements before the silicon is formed, and this is difficult to do by conventional methods. Previously, silane has been condensed and fractionally distilled for purification. This method is inconvenient, troublesome and dangerous since silane burns explosively upon contact with air. Moreover, the fractional distillation does not easily separate an impurity with a similar boiling point such as some of the hydrides. Sharp separations are frequently difficult because of overlapping vapor pressures, i.e. traces of vapor of a condensible component are carried through by the non-condensible fraction. Another difficulty is the formation of fog. Even though a component is condensed it is swept on through with the silane.

I have found that silane is effectively purified, i.e. hydrides of group V elements associated therewith are removed, by contacting the silane with a Lewis acid which does not decompose the silane. According to my invention, the silane in association with the hydride of a group V element is contacted with a Lewis acid and the silane is recovered. The Lewis acid is used in a solution of a suitable inert organic solvent. One particularly advantageous method is to bubble the silane gases through a liquid trap containing a solution of the Lewis acid. A series of such traps is advantageous in increasing the degree of separation. Thus, the silane gas stream can be continuously purified.

The hydrides of the group V elements of the periodic table effectively removed by the process of my invention include ammonia, phosphine, arsine, stibine and bismuthine.

Suitable inert organic solvents for use in the process include ethers such as, for example, diethyl ether, ethylene glycol dimethyl ether, and dioxane, and hydrocarbons such as, for example, toluene, benzene, kerosene, and hexane.

A Lewis acid as defined by G. N. Lewis is one which can employ a lone pair of electrons from another molecule in completing the stable group of one of its own atoms. Correspondingly, a Lewis base is one which has a lone pair of electrons which can be used to complete the stable groups of another atom. The Lewis acids useful in the process of my invention are those which do not decompose silane. Aluminum chloride and hydrochloric acid are preferred Lewis acids. Other Lewis acids which can be used are, for example, hydrofluoric, hydrobromic and hydroiodic acids.

The temperature range used in carrying out the process of my invention can vary from about −111° C. (the boiling point of silane) to as high as about 350° C. (the decomposing point of silane) although when a liquid trap is used the upper limit should be about 25° C. to prevent undue evaporation of the liquid.

The process of my invention will be further illustrated by the following experimental examples.

*Example I*

Since the methods of analyzing for very small amounts of antimony in silicon are not convenient, a method was devised to contaminate the silane and resultant silicon so as to make the analysis more suitable. The effectiveness of decontamination of the silane gas could then be demonstrated more conclusively. Stibine and silane were generated by the following reactions.

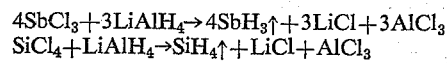

$$SiCl_4 + LiAlH_4 \rightarrow SiH_4\uparrow + LiCl + AlCl_3$$

The antimony trichloride and silicon tetrachloride in ether was added slowly to a suspension of lithium aluminum hydride also in ether. The mixture of silane and stibine gases was bubbled through a liquid to remove the stibine, dried in cold traps and decomposed thermally.

This technique was applied in an experiment to produce silane without treatment with a Lewis acid.

A generator was prepared somewhat similar to that described by Finhold, Bond, Wilzbach, Schlesinger, J. Am. Chem. Soc. 69, 2692 (1947), by fitting a dropping funnel to a 1-liter three-neck flask. An argon gas inlet was provided for the second opening and an exhaust outlet was fixed for the third opening. The reaction mixture was stirred by a magnetic stirrer and cooled by ice surrounding the flask. In addition to the generator there was, in order, a safety trap (to prevent liquid from the next trap from siphoning back into the generator), a liquid trap (in this case empty), two drying traps cooled to 0° or below to remove ether, a furnace and a safety exit. Mercury filled manometers which would release pressure but withstand a vacuum were connected to the apparatus in several places. The safety exit consisted of a tube which discharges silane under water. The exit of the tube will not clog with $SiO_2$ when the silane is released in this manner. The clean, dry and gas-tight apparatus was flushed with an inert gas such as nitrogen or argon. (*Warning*.—Silane must never be allowed to come in contact with air inside any apparatus, under any condition. A violent explosion will result.) Lithium aluminum hydride (3.0 grams) was added to the generator and the apparatus again flushed with inert gas. Thirty ml. of Ansul Ether 121 (dimethyl ether of ethylene glycol, hereafter referred to as ether) were added to the generator through the dropping funnel. To an additional 30 ml. portion of ether, 7.5 ml. of silicon tetrachloride and 0.2 gram of antimony trichloride were dissolved. This solution was added dropwise through the dropping funnel to the lithium aluminum hydride. The generated gases were dried and decomposed thermally. The thermal decomposition was accomplished by a tantalum wire heated to between 500 and 1000° C. The silicon deposited on the wire was dense while a bulky, loose form deposited on the walls of the furnace. The apparatus was flushed again with an inert gas before disassembling. The dense form contained between 0.1 to 1.0% antimony determined by spectrographic analysis. The bulky deposit contained between 1 and 10% antimony.

*Example II*

In a second experiment using the procedure of Example I, the liquid trap was filled with a solution of anhydrous aluminum chloride in ether to purify the silane contaminated with stibine. The experiment was carried out in the same manner as described in Example I. The dense silicon contained 0.01 to 0.10% antimony while the bulky silicon contained 0.03 to 0.3% antimony.

Thus, the method of my invention provides an effective and advantageous method of removing hydrides of group V elements from silane, in which the hydrides are selectively absorbed and rendered nonvolatile by reaction with a Lewis acid, to produce silane containing less than a few parts per billion of the hydrides. Such silane is particularly advantageous for preparing pure silicon by thermal decomposition.

I claim:

1. A method of purifying silane contaminated with hydrides of elements of group five of the periodic table which comprises passing a stream of silane contaminated with said hydrides of group five elements while in gaseous form through an anhydrous inert organic solvent solution of a Lewis acid selected from the group consisting of aluminum chloride and hydrogen halides in the absence of air, whereby the said hydrides of group five elements react with said Lewis acid and thereafter removing the gaseous silane from contact with said Lewis acid and recovering the silane in purified form.

2. A method of removing stibene from silane containing stibene as an impurity which comprises passing a stream of silane gas contaminated with stibene through an anhydrous inert organic solvent solution of a Lewis acid selected from the group consisting of aluminum chloride and hydrogen halides in the absence of air whereby the said stibene reacts with said Lewis acid and thereafter removing the gaseous silane from contact with said Lewis acid and recovering the silane free from stibene.

3. A method of purifying silane contaminated with hydrides of elements of group five of the periodic table which comprises passing a stream of silane contaminated with said hydrides of group five elements while in gaseous form through a series of traps containing an anhydrous inert organic solvent solution of aluminum chloride whereby the said hydrides of group five elements react with said aluminum chloride and thereafter removing the gaseous silane from contact with said solution of aluminum chloride and recovering the silane in purified form.

References Cited in the file of this patent

UNITED STATES PATENTS

| | | |
|---|---|---|
| 2,551,571 | Culbertson | May 8, 1951 |
| 2,844,441 | Pellin | July 22, 1958 |

FOREIGN PATENTS

| | | |
|---|---|---|
| 16,432 of 1896 | Great Britain | Jan. 30, 1897 |

OTHER REFERENCES

Mellor: "Comprehensive Treatise on Inorganic and Theoretical Chemistry," vol. 6, pages 216–218 (1925).

Johnson et al.: "Journal of the American Chemical Society," vol. 57, pages 1349–1353 (1935).

Hurd: "Chemistry of the Hydrides," 1952, page 133.

Jacobson: "Encyclopaedia of Chemical Reactions," 1946, vol. I, page 234.

Thomas: "Anhydrous Aluminum Chloride in Organic Chemistry," 1941, pages 36–37.

Reckleben et al.: "Zeitschrift für Analytische Chemie," vol. 49, pages 73–84 (1910).

Luder et al.: "Electronic Theory of Acids and Bases," 1946, pages 72, 92–94.

"Coordination Compounds of Boron Trichloride," by D. R. Martin, published in Chemical Reviews, vol. 34 (1944), page 462.